United States Patent
Crowley et al.

[11] Patent Number: 6,064,343
[45] Date of Patent: May 16, 2000

[54] ANTENNA COUPLING ARRANGEMENT

[76] Inventors: Robert J Crowley, 64 Puritan La., Sudbury, Mass. 01776; Donald N. Halgren, 35 Central St., Manchester, Mass. 01944

[21] Appl. No.: 09/133,769

[22] Filed: Aug. 12, 1998

Related U.S. Application Data

[63] Continuation-in-part of application No. 09/009,220, Jan. 20, 1998, which is a continuation-in-part of application No. 08/581,065, Dec. 29, 1995, Pat. No. 5,711,014, which is a continuation-in-part of application No. 08/042,879, Apr. 5, 1993, Pat. No. 5,493,702.

[51] Int. Cl.[7] .................................................. H01Q 1/24

[52] U.S. Cl. .......................... 343/702; 343/906; 455/90

[58] Field of Search .................................... 343/702, 906, 343/872, 841, 905; 455/575, 90; H01Q 1/24

[56] References Cited

U.S. PATENT DOCUMENTS

| | | | |
|---|---|---|---|
| 5,673,053 | 9/1997 | Marthinsson | 343/728 |
| 5,711,014 | 1/1998 | Crowley et al. | 455/575 |

*Primary Examiner*—Hoanganh Le
*Attorney, Agent, or Firm*—Don Halgren

[57] ABSTRACT

The present invention comprises an antenna coupling arrangement for connecting a portable communication device to a further signal transmission line. The portable communication device has an external radiative antenna. The coupling arrangement comprises a housing of generally rectilinear configuration having left and right sides, a lower side and a back side arranged to enclose a portable communication device. An antenna coupler is hingedly supported on the housing to pivotably mate with the external antenna of a portable communication device enclosed within the housing. The antenna coupler is connected to a transmission line for further connection to a further antenna or transmission line.

17 Claims, 3 Drawing Sheets

ANTENNA COUPLING ARRANGEMENT

This application is a continuation in part application of our co-pending U.S. patent application Ser. No. 09/009,220, filed Jan. 20, 1998, which is a continuation in part application of 08/581,065, filed Dec. 29, 1995, now U.S. Pat. No. 5,711,014, which is a continuation in part application of 08/042,879, filed Apr. 5, 1993, now U.S. Pat. No. 5,493,702, each of which is incorporated herein by reference in their entirety.

BACKGROUND OF THE INVENTION

1. Field of the Invention

This invention relates to electronic transmission devices, and more particularly to a coupling arrangement for improved data transmission with cellular phones.

2. Prior Art

Hand held portable communication devices have proliferated over the past several years. The increased in number of units utilized by the population mandates changes in the frequencies allotted to new cellular units. Those allotted frequencies are going up. In order to improve communication with those portable hand held units when they may be affected by walls of a building or a vehicle or distance between the antenna of the hand held communication device and a overhead satellite or a communication tower in the distance, clear communication may require supplemental transmission.

Coupling devices to improve the communications between the hand held communication device and the receiver of that communication is desired.

One such improvement device is shown in U.S. Pat. No. 5,673,053 to Marthinsson, which shows a loop-end antenna arranged within a housing, the loop-end antenna receiving a helical antenna from the cellular telephone to which it is attached. The housing is shown mated onto a particular chassis of a telephone. The disadvantage of this system is that it may be product specific, not being readily adaptable to multiple cellular phones and be awkward to manipulate the antenna into mating with the housing.

It is an object of the present invention to overcome these common disadvantages of the prior art.

It is yet a further object of the present invention, to provide an antenna coupling arrangement which permits the adaptation of a hand held cellular phone device to an antenna transmission coupling arrangement which is readily matable therewith.

It is still yet a further object of the present invention to provide an antenna coupling device, which may accommodate a wide variety of cellular telephone and antenna arrangements.

BRIEF SUMMARY OF THE INVENTION

The present invention comprises an antenna coupling arrangement for a coupling of any antenna/radiative transmission member of a typical hand held cellular telephone to a further transmission line.

The antenna coupling arrangement includes a rectilinear housing having an open side, a lower end, a backside, a left side, and a right side, and an upper most side. The generally rectilinear (preferably flexible) housing may have a lowermost lip extending along the lower end of its open side. The uppermost side has a first half and a second half. The second half being open to accept the protrusion of a radiative antenna (optical or electronic) of a hand held cellular phone therethrough. The first half of the uppermost side has an articulable antenna coupler arranged thereon. The articulable coupler comprises a stanchion with a hinge onto which a resilient arm is mounted. The resilient arm has a first end which is pivotable or swingable into juxtaposition with an antenna of a cellular telephone extending through the second half opening of the housing.

The resilient arm is connected to an axis adjacent its second end at the hinge point on the housing. A tuned feedline (electronic and/optical) extends through the resilient arm and may attach to a matching circuit electrically connected thereto, in the stanchion. The feedline may then be directed to a coaxial cable leading from the housing to a further transmission line or further antenna. The coaxial cable, which may be attached to a further circuit or a further antenna for subsequent transmission and receipt of electronic data by light or electromagnetic media therewith.

The first end of the resilient arm couples to the antenna protruding through the opening of the upper end of the enclosure housing. The first end may—in a first embodiment, comprises an elongated loop which pivotably swings over the top of the radiative antenna of the cellular phone within the housing. The loop would be supported in a flexible sheath, to permit slight bending or flexure of the loop against the antenna during its mating process.

In a further preferred embodiment of the present invention, the first end of the resilient arm is arranged with a capacitive plate attached thereto. In one embodiment of the capacitive plate, the plate is of a generally channel or U-shape so as to enclose at least about 180 degrees of the circumference of the radiative (helical/electronic) antenna of a cellular telephone which it accommodates. The capacitive plate which is pivotably engagable in generally longitudinal alignment with the antenna, may be somewhat resilient, encased in a rubberized sheath, to minimize any concerns of physical interference between the antenna and the plate.

The second end of the resilient arm is biased into the horizontal position perpendicular to the antenna. The second end of the resilient arm may also include an extended finger tab, to permit manual pivoting of the flexible arm about the axis arranged within the hinge stanchion.

The lower end of the enclosure housing may have a spring-like biased finger thereon, which engages the bottom or lowermost end of a hand held cellular phone placed within the housing. The biased finger is arranged to permit the cellular phone to be pressed against the upper end of the enclosure housing to as to ensure a proper relationship between the antenna coupler and the antenna of the cellular phone.

The invention thus comprises an antenna coupling arrangement for connecting a portable communication device to a further signal transmission line. The portable communication device has an external radiative antenna. The coupling arrangement comprises a preferably somewhat flexible housing of generally rectilinear configuration having left and right sides, a lower side and a back side arranged to enclose a portable communication device; and an antenna coupler hingedly supported on the housing to pivotably mate with the external antenna of a portable communication device enclosed within said housing. The antenna coupler is connected to a transmission line for further connection to a further antenna or transmission line. The antenna coupler may in one embodiment comprise an elongated arm having a loop antenna on a distal end thereof which mates circumferentially about the external antenna of the portable communication device for inductive coupling therebetween. The antenna coupler may in another embodiment, comprise an elongated arm having a plate antenna on a distal end thereof in parallel alignment with said external antenna of the portable communication device for capacitive coupling therebetween. The antenna coupler may in a further embodiment comprise an elongated arm having an optical photo coupler on a distal end thereof, in optical communication with the external (optical) antenna of the portable communication device for optical coupling therebetween.

The plate antenna is preferably of generally U-shape to at least partially enclose the external antenna of the portable communication device. The elongated arm is preferably resilient to permit slight bending thereof. The housing enclosure is preferably resilient to permit slight bending thereof, and proper introduction of a cellular device therein. The antenna coupler preferably has a rubberized sheath thereon. The elongated arm preferably has a second end with an extended tab thereon to permit manual pivoting of the elongated arm away from the external antenna on the portable communication device in the housing.

A biasing member may be arranged within the housing to press against the portable communication device for secure enclosure within the housing. A lip may be arranged across the lower end of the housing, to facilitate securement of the portable communication device in the housing.

The invention also includes a method of coupling a portable communication device having an external radiative antenna, with a further transmission line, comprising the steps of: providing a housing having a plurality of enclosure sides and bottom walls; placing the communication device in the housing; arranging an antenna coupler on an upper end of the housing, the antenna coupler connected to the further transmission line; and pivoting the antenna coupler on the upper end of the housing into rf communication with the external antenna of the communication device. The method in one embodiment, includes the step of: placing a loop antenna on the distal end of the antenna coupler to permit the loop antenna to surround the external antenna of the communication device for inductive rf communication therebetween.

The method in another embodiment, includes the step of: placing a plate antenna on the distal end of the antenna coupler to permit the plate antenna to be in a spaced apart rf capacitive coupling relationship with the external antenna of the communication device. The method in a yet a further embodiment, includes the step of: placing a photo coupler on the distal end of the antenna coupler to permit the photo coupler to be in swingable alignment and optical communication with the external antenna of the communication device.

Thus what has been shown is a unique articulable coupler arrangement for a hand held cellular phone which permits the adaptation of any of a line of cellular phones to be utilized in communication with a further transmission line through an antenna coupler carrying arm which pivots into and out of proximity to the radiative antenna of a cellular phone. The coupler arrangement may be an inductive loop coupler and/or planar/curvilinear capacitive coupler plate movable into and away from rf coupling, and/or an optical photo coupler emitter/detector with the external electronic/optical radiative antenna of a cellular phone situated in the housing.

BRIEF DESCRIPTION OF THE DRAWINGS

The objects and advantages of the present invention will become more apparent, when viewed in conjunction with the following drawings, in which.

DESCRIPTION OF THE PREFERRED EMBODIMENTS

Figure 1:
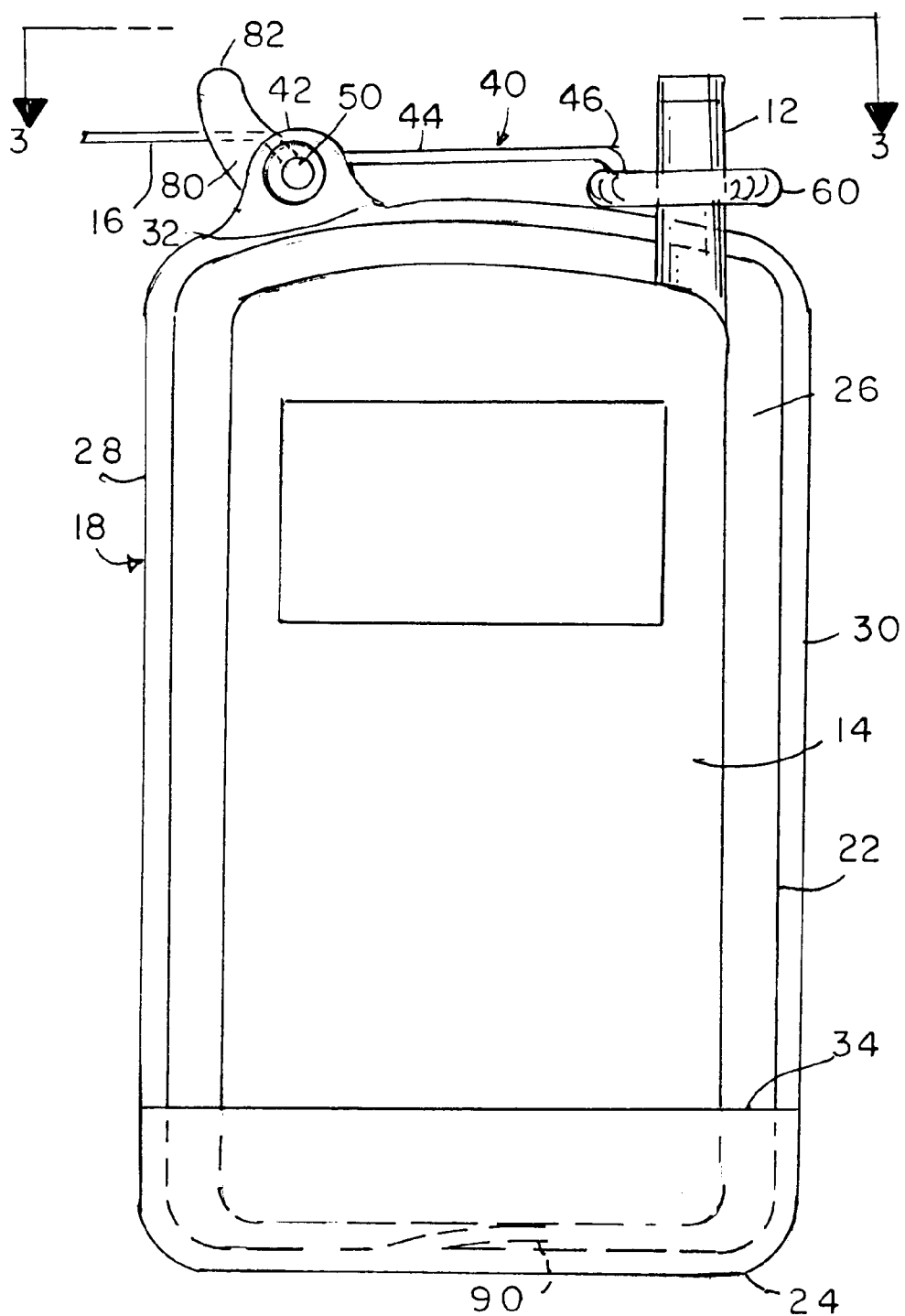
FIG. 1 is a front elevational view of a coupler arrangement and housing mated with a cellular telephone.
Figure 2:
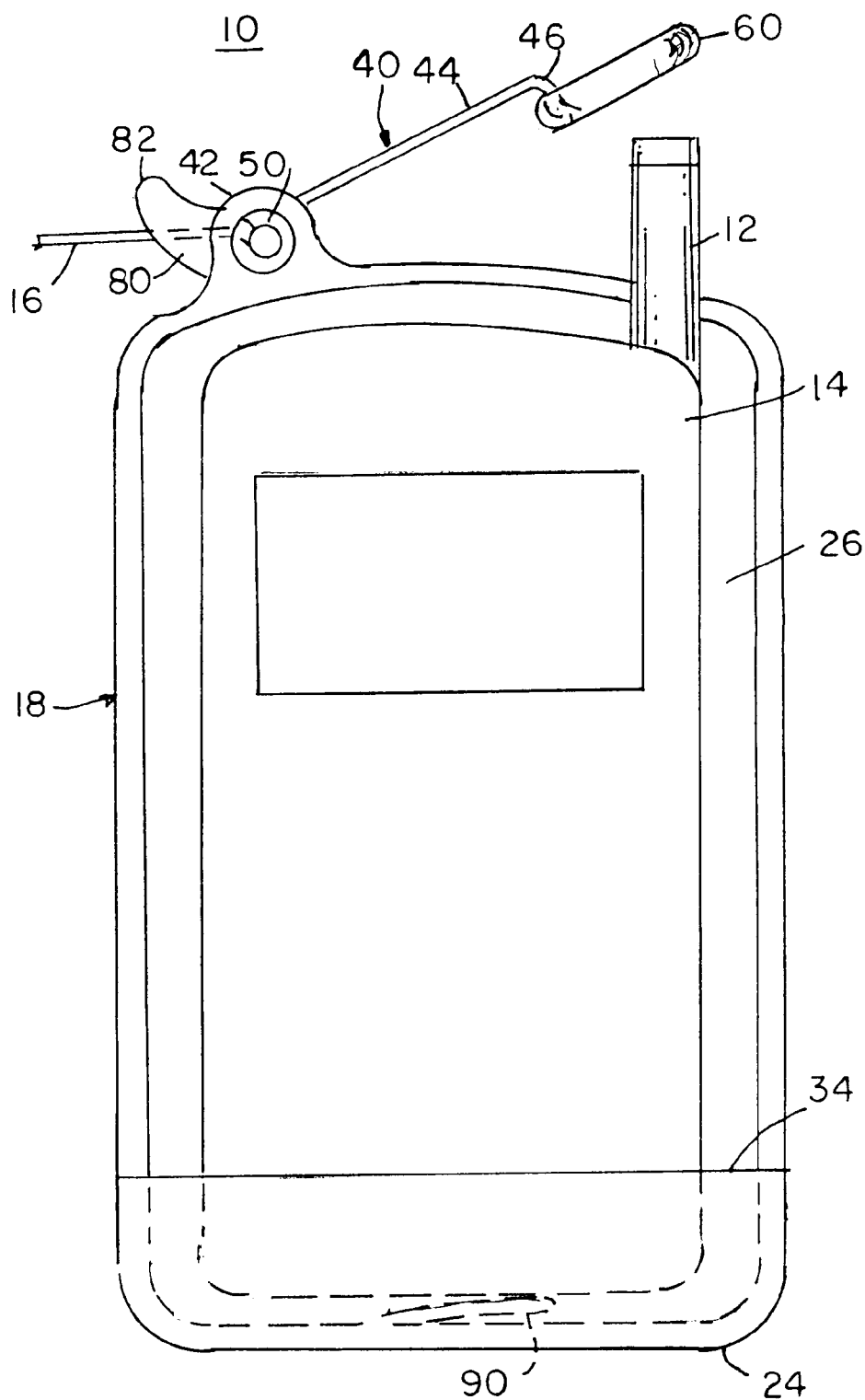
FIG. 2 is a view similar to FIG. 1 with the coupler arrangement pivoted away from the radiative antenna of the cellular phone within the housing.

Referring now to the drawings in detail, and particularly to FIGS. 1 and 2, there is shown the present invention which comprises an antenna coupling arrangement 10 for the coupling of any transmitting/receiving member-antenna 12 of a typical hand held cellular telephone 14 to a further (coaxial) transmission line 16.

The antenna coupling arrangement 10 includes a generally rectilinear housing 18 having an open front side 22, a lower end 24, a backside 26, a left side 28, a right side 30, and an uppermost side 32. The generally rectilinear, somewhat flexible housing 18 may have a lowermost lip 34 extending along the lower end of its open side 22. The uppermost side 32 has a first portion 36 and an open second portion 33. The open second portion 33 is open to accept the protrusion of the helical antenna 12 of a hand held cellular phone 14 therethrough. The first portion 32 of the uppermost side 32 has an articulable antenna coupler 40 arranged thereon. The articulable coupler 40 preferably includes a stanchion 42 with a hinge onto which a resilient arm 44 is mounted. The resilient arm 44 has a first end 46 which is pivotable or swingable into juxtaposition with an antenna 12 of a cellular telephone 14, the antenna 12 extending through the second open portion of the housing, as is represented by FIG. 2.

The resilient arm 44 is connected to an axis 50 adjacent its second end 52 at the hinge point on the housing 18. A tuned feedline (or optical fiber) 54 may be arranged to extend through the resilient arm 44 and may attach to a matching circuit 56 electrically connected thereto, in the stanchion. The feedline 54 may then be directed to the coax (or optical) transmission line 16 leading from the housing 18 to a further transmission line or further antenna, not shown for reasons of clarity. The coaxial cable 16 may be also attached to a further circuit or a further antenna for subsequent transmission and receipt of electronic data by light or electromagnetic media therewith.

Figure 3:
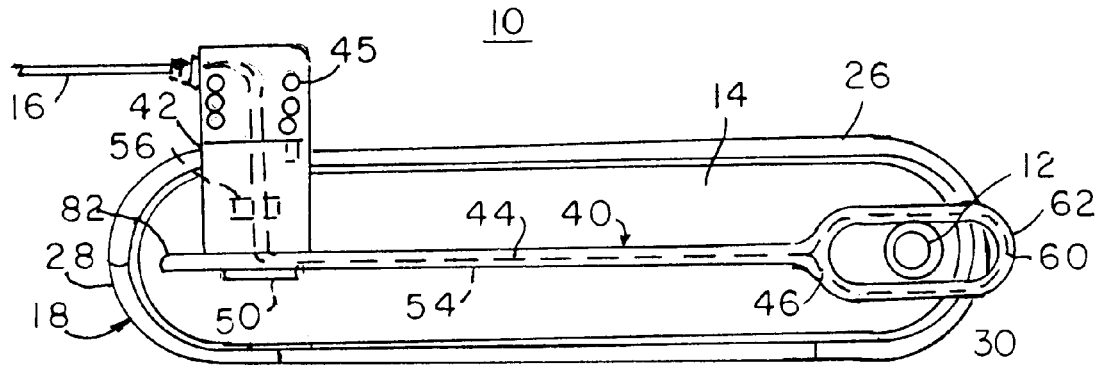
FIG. 3 is a view taken along the lines 3—3 of FIG. 1.

The first end 46 of the resilient arm 44 couples to the antenna 12 protruding through the open end 32 of the upper end of the preferably flexible enclosure housing 18. The first end, in a first embodiment, may comprise an elongated loop (antenna) 60, as best shown in FIG. 3, which pivotably swings over the top of the radiative antenna 12 of the cellular phone 14 within the housing 18, as best shown in FIG. 2. The loop 60 may be supported in a flexible (rubberized) sheath 62, to permit slight bending or flexure of the loop 60 against the antenna 12 during its mating process.

Figure 4:
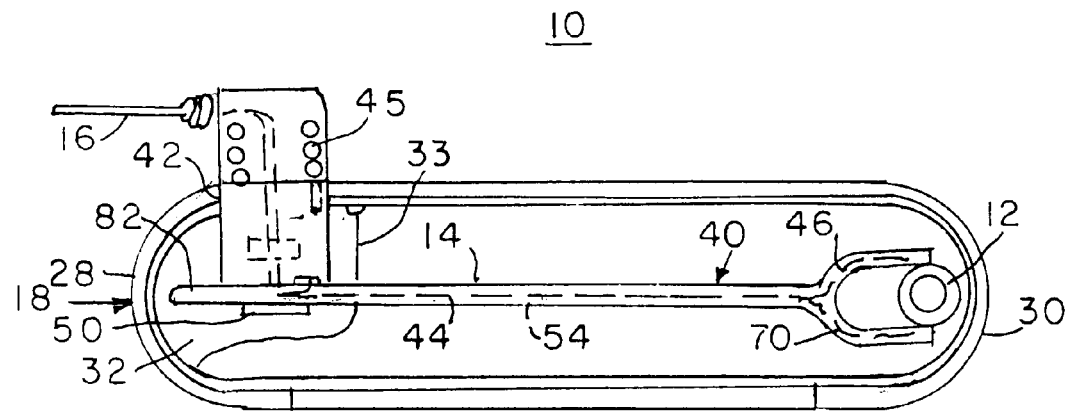
FIG. 4 is a view similar of that to FIG. 3 showing a capacitive plate coupler.
Figure 5:
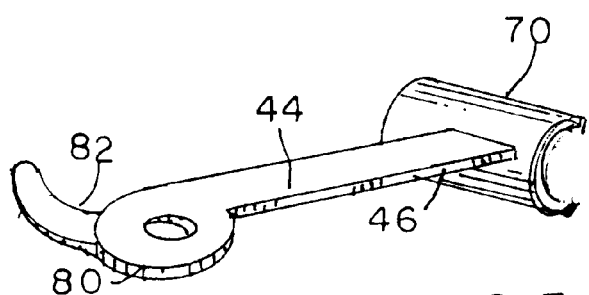
FIG. 5 is an isometric view of the resilient arm of the present invention utilizing a capacitive plate coupler therewith.

In a further preferred embodiment of the present invention, the first end of the resilient arm 44 is arranged with an elongated capacitive plate (antenna) 70 attached thereto, as represented in FIGS. 4 and 5. In one embodiment of the capacitive plate 70, the plate 70 is of a generally channel or U-shape so as to enclose at least about 180 degrees of the circumference of the radiative antenna 12 of a cellular telephone 14 which it accommodates. The capacitive plate 70 which is pivotably engagable in generally longitudinal alignment with the antenna 12, may be somewhat resilient, encased in a rubberized sheath, to minimize any concerns of physical interference between the antenna 12 and the plate 70.

In yet a further embodiment, a photo coupler such as a photo emitter (LED) and a detector (photo diode) are arranged in the arm 46 to transmissively connect to a similarly configured cellular telephone or communication device.

The first end 46 of the resilient arm 44 is biased into the horizontal position generally perpendicular to the helical antenna 12, by a spring 45, as represented in FIG. 1. The second end 80 of the resilient arm 44 may also include an extended finger tab 82, to permit manual pivoting of the flexible arm about the axis 50 arranged within the hinge stanchion 42.

The lower end 24 of the enclosure housing 18 may have a spring-like biased finger 90 therein, which finger 90 engages the bottom or lowermost end of a hand held cellular phone 14 placed within the housing 18. The biased finger 90 is arranged to permit the cellular phone 14 to be pressed against the upper end 32 of the enclosure housing 18 to as to ensure a proper relationship between the antenna coupler 40 and the transmissive antenna 12 of the cellular phone 14.

Thus what has been shown is a unique articulable coupler arrangement for a hand held cellular phone which permits the adaptation of any of a line of cellular phones to be utilized in communication with a further transmission line through a coupler carrying arm which pivots into and out of proximity to the electronic/optical antenna of a cellular phone. The coupler arrangement may be an inductive loop coupler and/or a planer or curvilinear capacitive coupler plate movable into and away from rf coupling and/or a photo coupler in optical communication with a similarly configured antenna of a cellular phone situated in the housing.

We claim:

1. An antenna coupling arrangement for connecting a portable communication device to a further signal transmission line, said portable communication device having an external radiative antenna, said coupling arrangement comprising:

a housing of generally rectilinear configuration having left and right sides, a lower side and a back side arranged to enclose said portable communication device; and an antenna coupler hingedly supported on said housing to pivotably mate with said external antenna of said portable communication device enclosed within said housing, said antenna coupler connected to a transmission line for further connection to a further antenna or transmission line.

2. The antenna coupling arrangement as recited in claim 1, wherein said antenna coupler comprises an elongated arm having a loop antenna on a distal end thereof which mates circumferentially about said external antenna of said portable communication device for inductive coupling therebetween.

3. The antenna coupling arrangement as recited in claim 1, wherein said antenna coupler comprises an elongated arm having a plate antenna on a distal end thereof in parallel alignment with said external antenna of said portable communication device for capacitive coupling therebetween.

4. The antenna coupling arrangement as recited in claim 3, wherein said plate antenna is of generally U-shape to at least partially enclose said external antenna of said portable communication device.

5. The antenna coupling arrangement as recited in claim 3, wherein said elongated arm is resilient to permit slight bending thereof.

6. The antenna coupling arrangement as recited in claim 3, wherein said elongated arm has a second end with an extended tab thereon to permit manual pivoting of said elongated arm away from said external antenna on said portable communication device in said housing.

7. The antenna coupling arrangement as recited in claim 1, wherein said antenna coupler comprises an elongated arm having an optical photo coupler on a distal end thereof, in optical communication with said external antenna of said portable communication device for optical coupling therebetween.

8. The antenna coupling arrangement as recited in claim 1, wherein said housing is resilient to permit slight bending thereof, and proper introduction of a cellular device therein.

9. The antenna coupling arrangement as recited in claim 1, wherein said antenna coupler has a rubberized sheath thereon.

10. The antenna coupling arrangement as recited in claim 1, including a biasing member arranged within said housing to press against a portable communication device for secure enclosure within said housing.

11. The antenna coupling arrangement as recited in claim 1, including a lip arranged across said lower side of said housing, to facilitate securement of said portable communication device in said housing.

12. A method of coupling a portable communication device having an external radiative antenna, with a further transmission line, comprising the steps of:

providing a housing having a plurality of enclosure side and bottom walls;

placing said communication device in said housing;

attaching an antenna coupler on an upper end of said housing, said antenna coupler connected to said further transmission line; and pivoting said antenna coupler on said upper end of said housing into communicative alignment with said external antenna of said communication device.

13. The method of coupling a portable communication device with a further transmission line as recited in claim 12, including the step of:

placing a loop antenna on the distal end of said antenna coupler to permit said loop antenna to surround said external antenna of said communication device for inductive rf communication therebetween.

14. The method of coupling a portable communication device to a further transmission line as recited in claim 12, including the step of:

placing a plate antenna on the distal end of said antenna coupler to permit said plate antenna to be in a spaced apart capacitive rf coupling relationship with said external antenna of said communication device.

15. The method of coupling a portable communication device to a further transmission line as recited in claim 12, including the step of:

placing a photo coupler on the distal end of said antenna coupler to permit said photo coupler to be in swingable alignment and in optical communication with said external antenna of said communication device.

16. The method of coupling a portable communication device to a further transmission line as recited in claim 12, including the step of:

biasing said antenna coupler into communicative alignment with said antenna of said communication device by a spring member arranged between said antenna coupler and said housing.

17. The method of coupling a portable communication device to a further transmission line as recited in claim 12, including the step of:

biasing said communication device within said housing into a position adjacent said coupler, by a pressure member arranged in said housing against said communication device.

\* \* \* \* \*